United States Patent
Strandberg et al.

(10) Patent No.: US 6,647,412 B1
(45) Date of Patent: Nov. 11, 2003

(54) METHOD AND NETWORK FOR PROPAGATING STATUS INFORMATION

(75) Inventors: Oye Strandberg, Cupertino, CA (US); Martha Zimet, Santa Cruz, CA (US)

(73) Assignee: Nokia Internet Communications Inc., Mountain View, CA (US)

( * ) Notice: Subject to any disclaimer, the term of this patent is extended or adjusted under 35 U.S.C. 154(b) by 658 days.

(21) Appl. No.: 09/599,737

(22) Filed: Jun. 23, 2000

(51) Int. Cl.[7] .............................................. G06F 5/173
(52) U.S. Cl. ....................... 709/223; 709/224; 370/241; 370/401
(58) Field of Search .................................. 709/200, 201, 709/223, 224; 370/241, 242, 243, 248, 252, 401

(56) References Cited

U.S. PATENT DOCUMENTS

| | | | | |
|---|---|---|---|---|
| 5,940,368 A | | 8/1999 | Takamichi et al. ........... 370/229 |
| 5,991,300 A | * | 11/1999 | Tappan ....................... 370/392 |
| 5,995,503 A | | 11/1999 | Crawley et al. ............. 370/351 |
| 6,295,296 B1 | * | 9/2001 | Tappan ....................... 370/392 |
| 6,525,850 B1 | * | 2/2003 | Chang et al. ................ 359/124 |
| 6,567,382 B1 | * | 5/2003 | Cox ............................. 370/255 |

OTHER PUBLICATIONS

Kilki et al., "Packet Discarding Inside a Sima Network a Waste of Network Resources?", vol. 3529, 1998, pp. 178–186.

* cited by examiner

*Primary Examiner*—Moustafa M. Meky
(74) *Attorney, Agent, or Firm*—Antonelli, Terry, Stout & Kraus, LLP

(57) ABSTRACT

A method and differential services network are provided for propagating status information. Status information may be obtained at the first edge node (or egress router). A first status message may be forwarded from the first edge node (or router) to the first core node (or router). The first status message may be updated based on status information at the first core node (or router). The updated first status message may be propagated to the second edge node (or ingress router).

27 Claims, 4 Drawing Sheets

FIG. 3

METHOD AND NETWORK FOR PROPAGATING STATUS INFORMATION

FIELD OF THE INVENTION

This invention relates generally to a differentiated services network and more particularly relates to propagating status information in a differentiated services network from an egress edge router to an ingress edge router.

DESCRIPTION OF RELATED ART

Increasing competition requires that service providers, such as ISPs, offer scalable, differentiated services that support their customers existing and emerging business applications. Service providers must not only differentiate among applications but also aggregate the traffic and then set priorities directly related to the latency, throughput, loss and jitter application requirements.

Differential service mechanisms allow service providers to allocate varying levels of services to users. Broadly speaking, this includes any traffic management or bandwidth control mechanisms that treats different users differently. However, in common Internet usage, the term is coming to mean any relatively simple, lightweight mechanism that does not depend entirely on pre-flow resource reservation.

Figure 1:
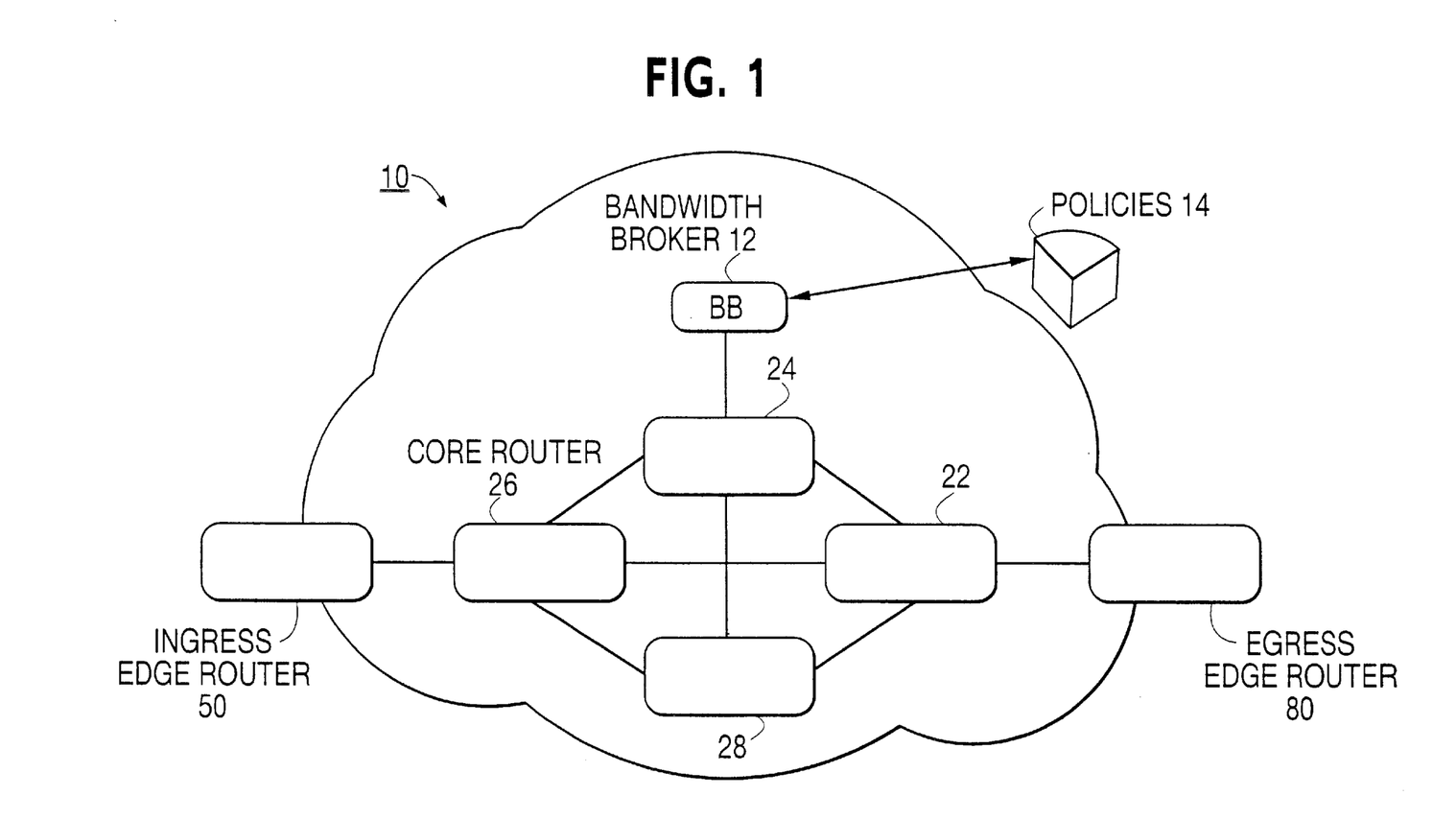
FIG. 1 is a view of a differentiated service network.

FIG. 1 shows a differentiated service network 10 that includes an egress edge router 80, an ingress edge router 50 and core routers 22, 24, 26 and 28. As is commonly known, the differentiated services network 10 implements a differentiating method between different data packets. The different treatment of the packets may be implemented by marking data packets at the edge of the network, such as the ingress edge router 50, and subsequently treating the data packets via other mechanisms within the network. The ingress edge router 50 preferably marks the data packets for the differential service and the core routers 22, 24, 26 and 28 in the interior of the network execute the specific treatment based on the marking.

The treatment of the data packets may be determined by a set of rules at the ingress edge router 50. The rules may be composed of a value statement and an action to be performed. The set of rules is commonly called a profile, policy or service level agreement. These rules may be a contract between the customer and the network operator that specifies the quality of service (QoS), the customer requirements and the cost associated with that service. The profile may be administrated through an entity known as the bandwidth broker 12 (also called the policy server). However, the administration of profiles does not take into consideration the knowledge of the active network status and therefore cannot adequately respond to dynamic network conditions.

SUMMARY OF THE INVENTION

The present invention may provide a method for propagating status information through a network, such as a differentiated services network. The network may include a first edge router (or node), a second edge router (or node), a first core router (or node) and a second core router (or node). The method may include obtaining status information at the first edge router. The first edge router may then propagate a first status message to the first core router. The first core router may update the first status message based on the status information at the first core router. The first core router may then propagate the first status message to a second core router where it may be updated based on the status information of the second core router. The first status message may then be propagated to the second edge router where it may be updated based on the status of the second edge router.

Even further, the first status message may be updated at the second edge router based on a status of the second edge router. The first status message may include a plurality of classes and a status of each of the classes.

The present invention may also include altering operation of the network based on status information at the second edge router.

The present invention may additionally obtain status information at a third edge router, and propagate a second status message from the third edge router to the first core router. The second status message may be updated based on status information at the first core router. The second status message may be propagated to the second edge router.

Still further, the first status message may propagate from the first edge router to the second edge router based on routing tables of the network. The first status message may be altered by status information at each node (or router) as the first status message propagates from the first edge router to the second edge router.

The present invention may also provide a network having a first edge router (or node), a second edge router (or node), a first core router (or node), a second core router (or node) and a controlling device. The controlling device may control the network and make decisions regarding data flow in the network. The network may operate such that status information is propagated from the first edge router to the second edge router along a propagation path. The propagation path may proceed from the first edge router to the second edge router based on routing tables of the network (i.e., reverse path of the routing tables). The status information may be updated at each router (or node) between the first edge router and the second edge router.

Other objects, advantages and salient features of the invention will become apparent from the following detailed description taken in conjunction with the annexed drawings which disclose preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

The present invention propagates status information through a differentiated service network. This is desirable since a router (also referred to hereinafter as a node) on the edge of the network may be able to obtain status information for traffic traveling towards an output link on the network edge. Status information may assist the bandwidth broker 12 (or other entity such as a QoS broker) to calculate, negotiate, accept or decline profile rules. The network status can be determined from several state parameters such as packet loss, delay rate, queue load, service rate, and stability.

The network operator and customer relationship may be defined by a traffic profile which is known as a contract, home policy or service level agreement. The profile describes the rules in packet marking. The aggregation of the rules is an agreement between the customer and the operator that specifies the quality of service (QoS) the customer requires and the cost associated for that service. That is, the quality of service corresponds to the goodness (quality) a certain operation (service) is performed with. Certain services, such as multimedia application or transatlantic phone calls, may require guarantees about accuracy, dependability and the rate of transmission performed. The quality of service is the spectrum of services that measure, improve and to some extent guarantee in advance network transmission rates, error rates, and other characteristics. The management of the traffic profile and its other associated list of rules may be performed by the QoS Firewall entity also called the Bandwidth Broker 12. The QoS Firewall may communicate with all interested parties regarding updating of the rules set and the management functionality to handle security, authentication and foundation of the policy request to accomplish reliable and correct operation of the differentiated service network.

As shown in FIG. 1, the differentiated services network 10 may include an ingress edge router 50, an egress edge router 80 and several core routers 22, 24, 26 and 28. It is understood that FIG. 1 is merely illustrative of an example embodiment as other configurations of the network are also within the scope of the invention. The ingress edge router 50 may maintain the state of the traffic flow, enforce the policy of traffic entering the network, map user requirements to network resources and negotiate between user preferences and network capabilities. A typical chain of actions performed on input traffic may be: classification, monitoring, policy lookup and policing, shaping and marking.

Packet marking closely relates to packet classification. Packet marking specifies that when a packet is identified as belonging to a particular traffic class, the packet may be marked with the appropriate treatment identification number. The packet treatment may be realized with a combination of queue handling and scheduling so that the packet delivery agrees with the packet marking. The monitoring role follows the resources assigned to packet treatment and collects traffic performance statistics. This can be as simple as polling the queue load or as complicated as collecting statistics on each action for each packet. The control of marking, treatment and node status monitoring may be realized by the QoS Firewall, which is designated to manage the internal resources for each network node and convey control signals to and from higher level entities that manage the network. An important task of the QoS Firewall may be to support status message propagation.

The core routers 22, 24, 26 and 28 are provided within the network to forward packets based on their marking which was realized by the edge router. As is well known in the art, each router within the network 10 may include a routing table that indicates a path to forward data packets. This direction of forwarding data packets is hereafter called a forwarding direction of the routing table.

The core routers 22, 24, 26 and 28 differentiate traffic classes through the treatment of buffer queues and scheduling methods. Typically, each node in the network 10 contains more than one queue for servicing the different traffic classes and there is one queue for each service class. For example, the differential service network 10 may include five different traffic classes such as assured forwarding classes (1–4) and expedited forwarding class (5). Other types of the traffic classes are also within the scope of the present invention. The status parameters for each traffic class contributes to the overall status at each node or router. When each node's status can be collected, then the overall network status can be known.

The bandwidth broker 12 may be a controlling device that negotiates the policy for traffic flows entering the network through the ingress edge router 50. The bandwidth broker 12 may be responsible for proper allocation of traffic in the differentiated service network 10 and may rely on heuristics to decide if a policy request can be accepted or not. The heuristic rules may be commonly evolved through trial and error to obtain the knowledge regarding what kind of traffic can be accepted. The bandwidth broker 12 also may be responsible for allocating preferred service to users and for configuring the network routers with the correct forwarding behavior for the desired service. As shown in FIG. 1, the bandwidth broker 12 may include a policy database 14 that contains information on how users, sets of users, content types, etc. are treated when they are present in the network 10.

Stability of the network 10 may be dependent on scheduling decisions made at the router level. There are two notions for stability. First is that of router overflow when the number of packets coming into a network is too high with respect to the processing capability of the router. No matter what order the data packets are processed, the incoming workload always exceeds the capacity of the router. Second is of network instability when higher precedence is given to certain classes so as to starve some of the router's traffic and create blocking.

In order to contribute toward stability and to better meet the needs of the customers, the present invention preferably propagates status information through the differentiated service network by principles similar to data protocols for routing tables. Status information regarding a particular node (or router) may be propagated to neighboring nodes. Each node receiving the status information may then update the status information and similarly propagate the updated status information to neighboring nodes. This propagation of status information may continue until the status information reaches an edge router and the information has stabilized (i.e., correct and complete values reach the edge). The status propagation preferably starts at the egress edge router 80 and propagates status information from the egress edge router 80 (i.e., the outgoing links exiting the differentiated services network) towards the ingress edge router 50. This is preferably done by following the routing table(s) of the network in a reverse manner as will be described. The status information is preferably propagated to all neighboring routers except the router from which the current router received the status information. Each router may determine whether it should receive this information based on its own routing table. If the current router should receive the status information, then the current router may update the status information and likewise propagate the status information to its neighboring routers. If the current router should not receive the information, then the status information may be ignored or discarded. The status parameters may be collected and communicated through the neighboring nodes (i.e., routers). Each core node (or router) may add its own status information to the status message (also called the status digest) and propagate the information to its neighboring nodes. Each neighboring node determines whether it receives the status information based on its own routing table. This process is continued until the node status indications have reached an ingress node such as the ingress router 50. The ingress node (or ingress edge router 50) will therefore contain complete knowledge of the status of all traffic going to all other edge nodes that serve as egress points in the network.

Figure 2:
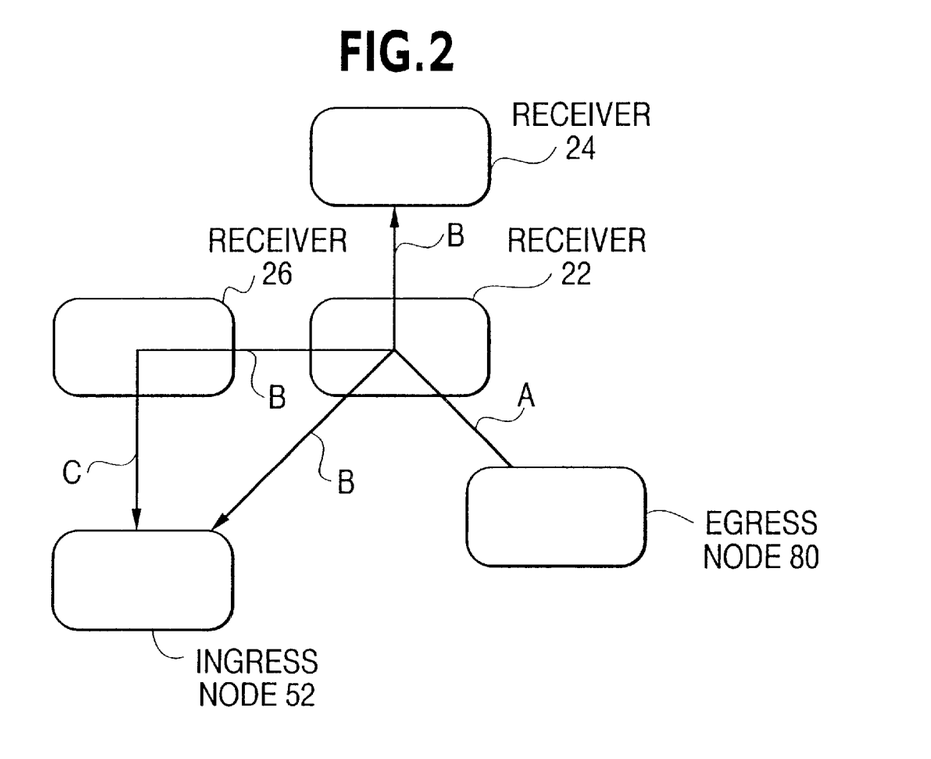
FIG. 2 is a view showing status propagation from the egress router towards the ingress router in accordance with the present invention.

FIG. 2 shows an example embodiment of the present invention of how status information may be propagated from the egress edge router (or node) 80 to the ingress edge router (node) 52. In this example, a status message A may be first transmitted from the egress edge router 80 to its neighboring nodes, namely the core router 22. Core router 22 may determine whether it should receive the first status message A based on its routing table. More specifically, core router 22 determines, based on its routing table, whether it would forward data packets to the egress router 80 if data packets were being transmitted in a normal manner.

The first status message A sent from the egress edge router 80 is generally a normal status condition for the output port. The status situation for the interface of the egress edge router 80 with the core router 22 may contain one address space and several quality classes (i.e., a status indication for each of the classes).

The status message A is received at the core router 22 and may be updated to reflect the status at the core router 22. The updated status message may be called the status message B (or the updated status message B). The core router 22 may then propagate the updated status message B to each of its neighboring routers, namely the core router 24, the core router 26 and the ingress edge router 52. Each of these routers may then examine their respective routing tables to determine whether they should receive the status information. Once again, this is preferably based on the routing table at each router. If it is appropriate to receive the status information, then the respective router may also update the status message, if necessary. If it is not appropriate to receive the status information, then the status message may be discarded or ignored.

The core router 24 may similarly update the status message based on its own status and appropriately propagate the updated status message to its neighboring nodes except from router that just propagated the status message, namely the core router 22. The core router 26 would also similarly update the status message it received from the core router 22 and appropriately propagate the updated status message to its neighboring nodes except from the router that just propagated the status message, namely core router 22.

In the FIG. 2 example embodiment, the status message B is also propagated from the core router 22 to the ingress edge router 52. Upon receiving the status message B and determining that it is proper to receive the status message B, the ingress edge router 52 may likewise update the received status message if appropriate. The core router 26 may also propagate its updated status message C to the ingress edge router 52 which may update the status message based on its own status if it is appropriate to receive the updated status message.

The ingress edge router 52 eventually receives all the status messages from the other edge devices and incorporates these status messages into a status representation table. Propagation of status at the ingress edge router 52 differs from propagation at the core routers. First, the ingress edge router 52 does not propagate the status message to its neighbors outside the differentiated network 10. Second, the ingress edge router 52 collects all the status messages and builds the representation table of the quality indications for all the quality classes from the ingress edge routers to all of the reachable egress edge routers of the network. Third, the representation table may be included in the classifier so that anytime a data packet arrives at the ingress edge router, it can be handled according to the status indication for its type of quality class and destination. Fourth, the representation table from each ingress edge router may be sent to the bandwidth broker 12 to support intelligent policy decisions.

Figure 3:
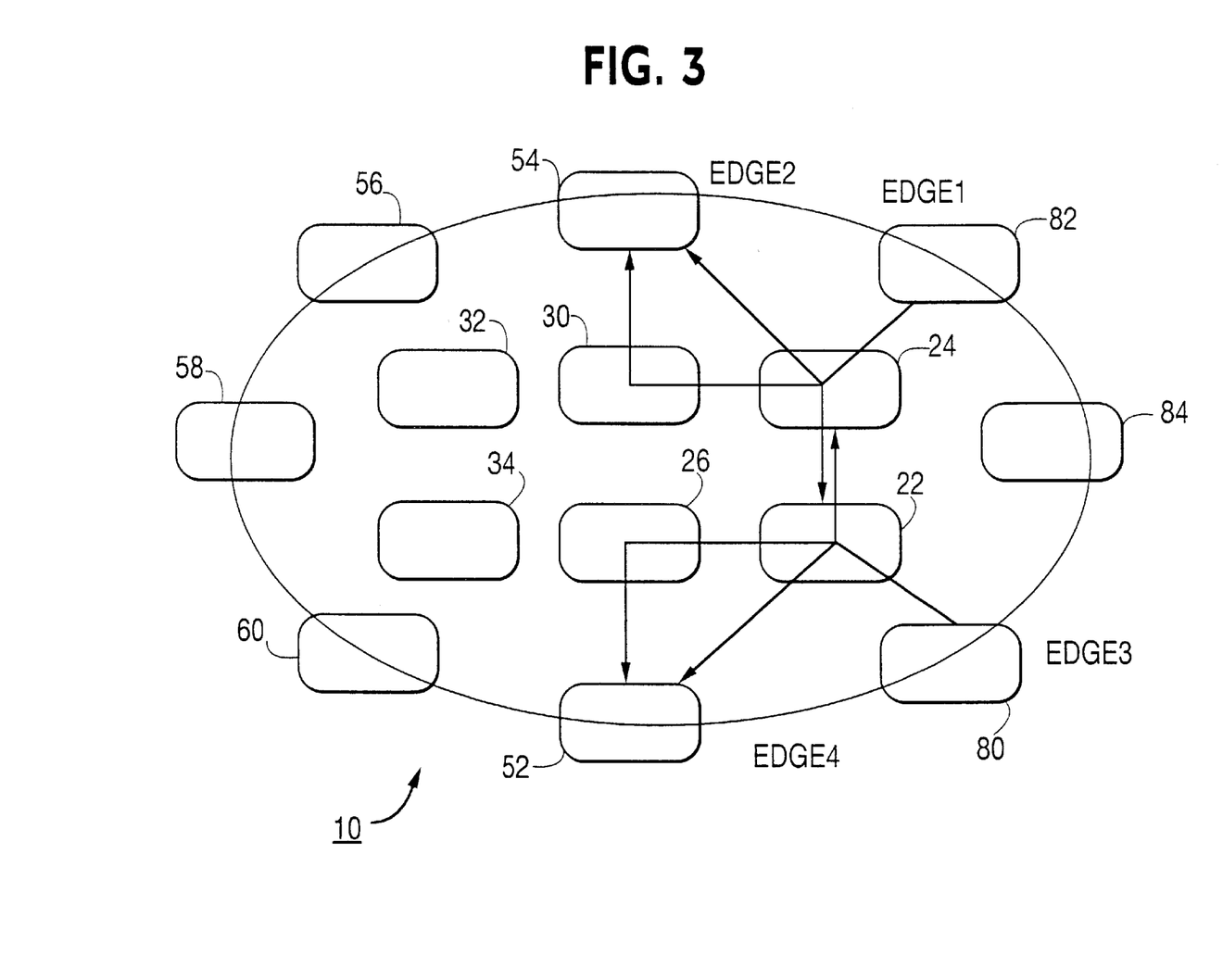
FIG. 3 is another view showing status propagation from the egress edge routers to the ingress edge routers in accordance with the present invention.

FIG. 3 shows a further example embodiment of how status information may be propagated through the network 10. This embodiment is similar to the previously described example embodiments but includes additional routers (or nodes) 30, 32 and 34. The differentiated services network 10 includes the egress edge routers 80, 82 and 84 and the ingress edge routers 52, 54, 56, 58 and 60. One skilled in the art would understand that an ingress edge router may also function as an egress edge router. For simplicity sake, FIG. 3 only shows propagation of status information from the egress edge routers 80 and 82 towards the ingress edge routers 52 and 54. It is understood that each of the egress edge routers (including edge router 84) may likewise propagate status information though different propagation paths even though all the paths are not shown in FIG. 3. Further, status information may be propagate to each of the ingress edge routers 52, 54, 56, 58 and 60 although those propagation paths are also not shown in FIG. 3.

As shown in FIG. 3, status information (i.e., a status message) may be propagated from the egress edge router 80 to the core router 22. In similar fashion to that described above, the core router 22 may update the status message and likewise propagate the updated status message to each of its neighboring routes, namely the core router 24, the core router 26 and the ingress edge router 52. Once again, the propagating of the status message is preferably based on routing table(s) and more specifically is done in a direction opposite to the forwarding direction, namely, a reverse direction of the routing table(s). The use of the routing table for the propagation path is merely illustrative of the present invention. Other methods of propagating the information are also within the scope of the present invention.

The core router 26 may then update the received status message, if appropriate, based on its own status and propagate the updated status message to its neighboring router. For ease of illustration, FIG. 3 only shows the updated status message being propagated to the ingress edge router 52. Likewise, the core router 24 may also update the received status message, if appropriate, and propagate the updated status message to the ingress edge router 54 and to the core router 30. The core router 30 updates the status message, if appropriate, and propagates the updated status message to the ingress edge router 54. Once again, propagating of the status messages is preferably based on routing table(s) and more specifically is based on a reverse direction of the routing table(s).

Similarly, the egress edge router 82 may propagate its own status information to the core router 24. The core router 24 may then update the status message, if appropriate, and propagate the status message to its neighboring routers, namely the core router 22, the core router 30 and the ingress edge router 54. Each of the core routers 22 and 30 may then appropriately update the received status message, if appropriate, and propagate the updated status information. In this example, the core router 30 propagates the status message to the ingress router 54, the core router 22 propagates the updated status message to the core router 26 and to the ingress edge router 52. The core router 26 would also update the status message, if appropriate, and propagate the status message to the ingress edge router 52.

As discussed above, the FIG. 3 embodiment preferably uses the routing table (i.e., in the reverse order) to determine how to propagate the status messages from each of the egress edge routers to each of the ingress edge routers. The routing table would thus encompass more routers (i.e., the routers 32, 34, 56, 58 and 60) than have been discussed. Further, updated messages may be propagated in paths other than that shown in FIG. 3.

Each connection between a node (or router) and another node (or router) may include a status indication and information associated with that connection. The associated information may include the target addresses reachable from that node (or router) and the status of each traffic class on that link. The status may be a qualitative indication such as a color scheme. For example, green may be used to signify an OK status, yellow may signify a warning status, and red may signify an error status. Other ways of indicating the status of each traffic class are also within the scope of the present invention.

The status may be internally and independently calculated for each node (i.e., each router). The status propagating may be analogous to flooding the link status of each egress node's outgoing links until the status reaches all ingress edge routers (or nodes). The propagation starts with each egress edge router. The status of each outbound link may be encapsulated in a status message and sent to every neighboring node as discussed above. The neighboring node may receive the status message and determine whether it should discard the status information based on its routing table. The node may compare the status information with its own status state. The egress node's status may be updated in the status message if the node receiving the message has a status that is lower than the status indicated in the status message.

After the status update, the status message may be propagated to all neighboring nodes except in the direction where the message was received from. The message processing may be repeated at every node receiving the status message and continue until the status information reaches an edge node (i.e., preferably an ingress edge rate). At edge nodes, a status update may take place but the status messages are preferably not propagated to any neighboring nodes. The bandwidth broker 12 may receive the representation tables which correspond to the status message at each of the ingress edge routers. The propagating process for a node may be modeled based on the following example algorithm:

1 Take address of statusMessage (addressB=first address in address list)
2 interface1=statusMessage.incommingInterface
3 if (routingDecision(addressB)==interface1)
  a update(Node.interface.status,Message.status)
  b send new statusMessage to all neighbor nodes, except interface1
4 else
  a Discard statusMessage In the first part of this algorithm, an address is retrieved from the address list to use for checking the routing direction. The address may be the first address in a list of addresses that is reachable from a respective node or router. The interface (or link) where the status message is arriving from is stored in the second part of the algorithm. The third part is the message propagation algorithm in which if the status message comes from a node that is acknowledged as the proper routing direction, then the message may be considered valid to be used in updating the propagated status information. That is, if data packets may be propagated along the path specified by the routing table(s), then it is appropriate to propagate the status information in a reverse path. The status message also is preferably not forwarded back to a node from which the status message was sent. The message propagation algorithm relies on the routing tables to be correct. The fourth part of the algorithm relates to when the message propagation algorithm does not acknowledge a proper routing direction, then the arriving status message is irrelevant and may be ignored. This algorithm is merely illustrative of the invention as other example algorithms are also within the scope of the present invention.

Figure 4:
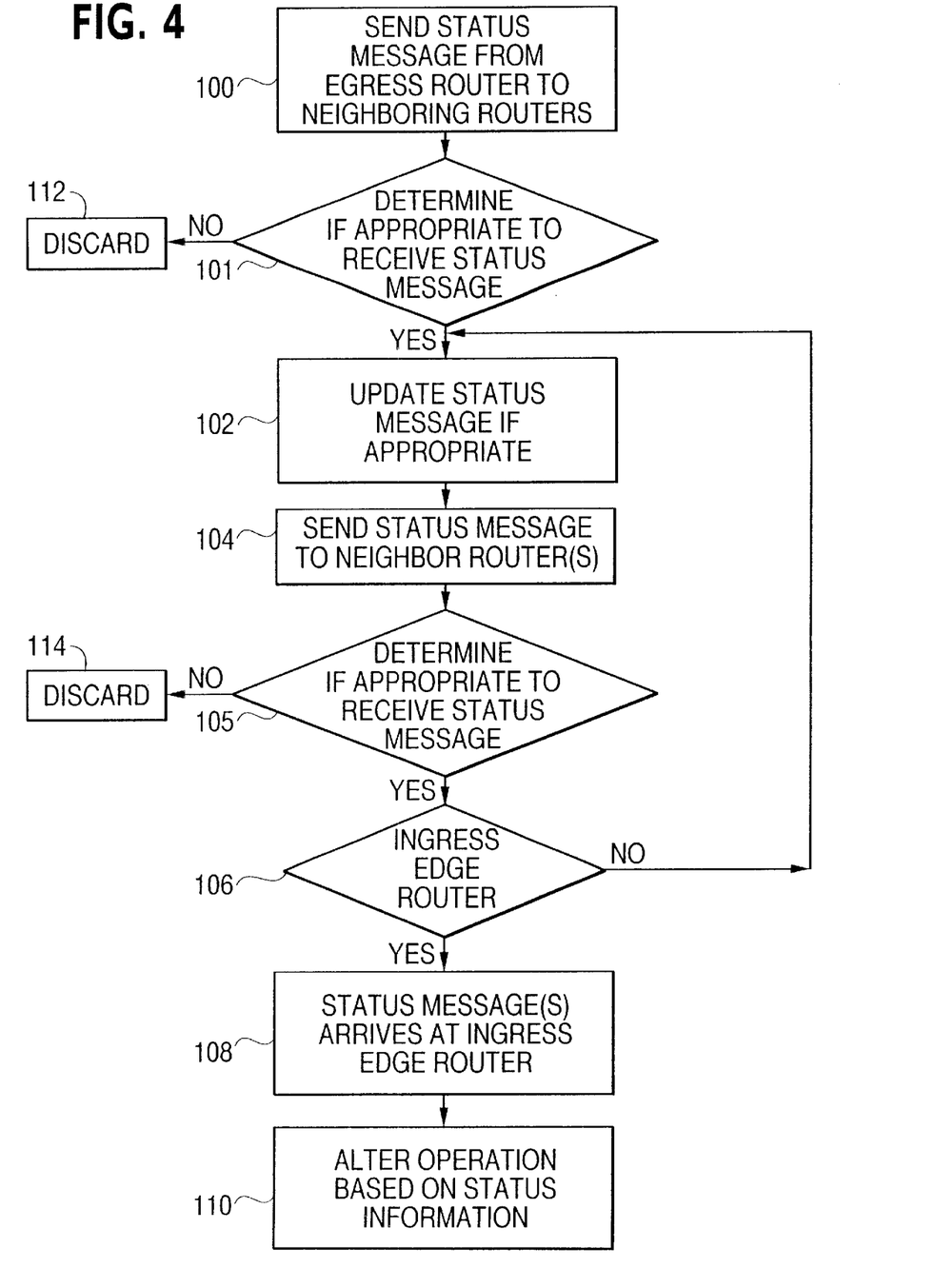
FIG. 4 is a flowchart showing one example method according to the present invention.

FIG. 4 shows an example flowchart of a method of performing the present invention. It is understood that this example method is merely illustrative and that other methods are also within the scope of the present invention. In step 100, a status message is sent from at least one egress edge router to its neighboring routers. In step 101, the router (i.e., the current router) receiving the status message determines if it is appropriate to receive the status message. As discussed above, this is preferably based on the routing table. If it is appropriate, then in step 102, the status message may be updated at the current core router to reflect the status of the current core router. If it is inappropriate for the router to receive the status message, then the message may be discarded or ignored in step 112.

The updated status message may be propagated to the neighboring router(s) in step 104. In step 105, the receiving router (i.e., the new current router) determines whether to accept or discard the status message based on a routing table provided at each router. If it is appropriate, then step 106 decides whether the router is an ingress edge router. If it is an ingress router, then the method proceeds to step 108. If the router is not an ingress edge router, then the procedure repeats steps 102, 104 and 105 for the next core router which becomes the new current router for purposes of step 102 until step 106 is complete and the loop reiterates. One skilled in the art would understand that steps 102, 104, 105 and 106 may be repeated any number of times until all of the respective propagation paths have separately been propagated to the ingress edge router. Further, the method preferably begins at step 100 with each egress edge routers separately forwarding a status message to its neighboring routers.

Step 108 signifies that the status message has arrived at the ingress edge router. This status information may be compiled at each ingress edge router to form the representative table. Subsequently, the network may alter operations (i.e., the policy) based on the status (i.e., the representative table) at the edge routers.

The overall network status may be dependent on the numerous status representation tables collected at each of the ingress edge routers. The bandwidth broker 12 may collect the representation tables at each ingress node and deduce the resources and traffic profiles the network can handle. This propagation scheme may be performed at a cyclical rate to update new network conditions. This provides the intermediate nodes a time frame in order to collect status information. The propagation scheme may also occur when a change in the link status occurs. The bandwidth broker 12 may take an appropriate action according to the status indications. Some examples of appropriate action may be any of the following: packet drop, packet delay, traffic class relocation, rerouting, profile renegotiation or deletion. The operator may also be informed about a situation that needs consideration.

The ideal situation for traffic entering a differentiated service network is when the ingress node (or routers) knows beforehand the quality of traffic it will generally receive. The present invention allows the status information to be available at the ingress node before the traffic (i.e., data packets) enters the network. The packet treatment may be according to quality class and the destination egress node.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention. For example, the above embodiments describe propagating status information from an egress edge router to an ingress edge router. The present invention is also applicable to propagating status information in other ways such as a method that does not rely on the routing table or one that goes from an ingress edge route to an egress edge route.

What is claimed is:

1. A method of propagating status information through a network having a first edge router, a second edge router, a first core router, the method comprising:
   propagating first status information from said first edge router to said first core router; and
   propagating second status information to said second edge router, wherein said second status information is based on said first status information.

2. The method of claim 1, further comprising propagating third status information from a third edge router to a second core router.

3. The method of claim 2, further comprising propagating fourth status information from said second core router to said second edge router, wherein said fourth status information is based on said third status information.

4. The method of claim 1, wherein said second status information is obtained at said first core router by updating said first status information based on additional status information at said first core router and propagating said second status information comprises propagating said second status information from said first core router to said second edge router.

5. The method of claim 1, wherein said network comprises a differentiated services network.

6. The method of claim 1, wherein said second edge router comprises an ingress edge router and said first edge router comprises an egress edge router.

7. The method of claim 1, further comprising altering operation of said network based on status information received at said second edge router.

8. The method of claim 1, wherein said second status information comprises a status of each traffic class of said network.

9. The method of claim 1, wherein status information propagates from said first edge router to said second edge router based on routing tables of said network.

10. A method of propagating status information in a network, said network comprising a first edge node, a second edge node, a first core node and a second core node, said method comprising:
    obtaining status information at said first edge node;
    propagating a first status message from said first edge node to said first core node;
    updating said first status message based on status information at said first core node; and
    propagating said updated first status message to said second edge node.

11. The method of claim 10, wherein propagating said updated first status message to said second edge node comprises propagating said updated first status message from said first core node to said second core node and further updating said first status message based on status information at said second core node.

12. The method of claim 10, further comprising updating said first status message at said second edge node based on status information at said second edge node.

13. The method of claim 10, further comprising:
    propagating said updated first status message from said first core node to a third core node;
    updating said first status message at said third core node; and
    propagating said updated first status message from said third core node to a third edge node.

14. The method of claim 10, further comprising:
    obtaining status information at a third edge node;
    propagating a second status message from said third edge node to said first core node;
    updating said second status message based on status information at said first core node; and
    propagating said updated second status message to said second edge node.

15. The method of claim 10, wherein said first status message comprises a plurality of classes and a status of each of said classes.

16. The method of claim 10, wherein said network comprises a differentiated services network.

17. The method of claim 10, wherein said first edge node comprises an egress edge router and said second edge node comprises an ingress edge router.

18. The method of claim 10, further comprising altering operation of said network based on status information at said second edge node.

19. The method of claim 10, wherein said first status message propagating from said first edge node to said second edge node based on routing tables.

20. The method of claim 10, wherein said first status message is altered by status information at each node of said network as the first status message propagates from said first edge node to said second edge node.

21. A differential service network comprising:
    a first edge node;
    a second edge node;
    a first core node and a second core node both provided between said first edge node and said second edge node; and
    a controlling device that controls said network and makes decisions regarding data flow in said network, said network operating such that status information is propagated from said first edge node to said second edge node along a propagation path.

22. The network of claim 21, wherein said first edge node comprises a first edge router, said second edge node comprises a second edge router, said first core node comprises a first core router and said second core router comprises a second core router.

23. The network of claim 22, wherein said propagation path proceeds from said first edge router to said second edge router based on routing tables of said network.

24. The network of claim 23, wherein said propagation path comprises a reverse path of said routing table.

25. The network of claim 21, wherein said status information is updated at each node between said first edge node and said second edge node.

26. The network of claim 21, wherein each egress node separately propagates an independent status message into said network, each independent status message propagating through said network toward each ingress node.

27. The network of claim 21, wherein said controlling device adjusts operation of said network based of status information received at least at said second edge node.

* * * * *

UNITED STATES PATENT AND TRADEMARK OFFICE
CERTIFICATE OF CORRECTION

PATENT NO. : 6,647,412 B1
DATED : November 11, 2003
INVENTOR(S) : Ove Strandberg et al.

It is certified that error appears in the above-identified patent and that said Letters Patent is hereby corrected as shown below:

<u>Title page,</u>
Item [75], Inventor, please correct inventors name to read -- Ove Strandberg --.

Signed and Sealed this

Eighth Day of June, 2004

JON W. DUDAS
*Acting Director of the United States Patent and Trademark Office*